(12) United States Patent
McGarvey

(10) Patent No.: US 7,779,010 B2
(45) Date of Patent: Aug. 17, 2010

(54) REPARTITIONING LIVE DATA

(75) Inventor: John R. McGarvey, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 11/954,481

(22) Filed: Dec. 12, 2007

(65) Prior Publication Data
US 2009/0157776 A1 Jun. 18, 2009

(51) Int. Cl.
G06F 17/30 (2006.01)

(52) U.S. Cl. ........................ 707/737; 707/639

(58) Field of Classification Search ......... 707/200–206, 707/609, E17.005
See application file for complete search history.

(56) References Cited

U.S. PATENT DOCUMENTS

| | | | |
|---|---|---|---|
| 5,870,761 A * | 2/1999 | Demers et al. .............. 707/201 |
| 5,884,328 A * | 3/1999 | Mosher, Jr. ................. 707/202 |
| 6,223,182 B1 * | 4/2001 | Agarwal et al. ............. 707/102 |
| 6,889,231 B1 * | 5/2005 | Souder et al. ............ 707/104.1 |
| 2005/0210082 A1 | 9/2005 | Shutt et al. |
| 2007/0016631 A1 * | 1/2007 | Robert et al. ............... 707/204 |
| 2007/0294276 A1 * | 12/2007 | Shen et al. .................. 707/102 |

* cited by examiner

Primary Examiner—Tim T. Vo
Assistant Examiner—Shiow-Jy Fan
(74) Attorney, Agent, or Firm—DeLizio Gilliam, PLLC

(57) ABSTRACT

A data set typically does not stagnate and remain the same size over time. The capabilities of hardware (e.g., servers and storage devices) also do not stagnate and remain the same. A date set is often repartitioned to accommodate changes in size of the data set and/or changes in hardware capability. Hundreds or thousands of writes may be performed on the data set (e.g., database, directory, etc.) every second. So, even a few seconds of downtime are unacceptable. Instead of taking the data set offline, the data set can be repartitioned while still allowing access to the data set ("repartitioning live data"). Live data can be repartitioned by establishing update or replication queues for the new partitions while servicing write requests and read requests with the old partitions. After the data has been migrated, the update queues are drained to ensure data integrity.

20 Claims, 4 Drawing Sheets

REPARTITIONING LIVE DATA

TECHNICAL FIELD

Embodiments of the inventive subject matter generally relate to the field of data management, and, more particularly, to repartitioning a live data set.

BACKGROUND

When creating large directories or large databases, it is sometimes necessary, primarily for scaling purposes, to partition the data so that each server only holds a subset of the data. The data is front ended by a proxy or chaining function, so that the aggregate of all data is presented as a single directory or database. This partitioning may occur for a variety of directory technologies, including, but not limited to, directories accessed via Lightweight Directory Access Protocol (LDAP), directories implementing the X.500 standards, Home Location Registry (HLR) directories used by telephone service providers, and others. This partitioning may also occur for a variety of database technologies, including, but not limited to, relational databases, indexed flat file databases, and object oriented databases. For example, Tivoli® Directory Server allows for a directory with 180 million entries. To add additional read capacity, the directory server can create additional replicas. But this does not help to provide additional write capacity because each change roust be propagated to every copy. Therefore the directory server partitions the date so that each server holds only a subset. The 180 million entries may be split into 6 partitions, each with 30 million entries.

For a directory, the partitions can be made by creating a hash of the naming attribute for a given object, and allocating the entries to 6 hash buckets. Each of the hash buckets define a partition of the data stored on a separate server. A database may be partitioned in a similar way, for example by hashing on a primary key. A proxy is implemented to route operation requests (search, add, delete, modify, etc.) to each of the partitions so that the partitions appear as one large directory.

As the amount of data grows, the original number of partitions becomes inadequate. In the above example, the 180 million entries might grow over time to 300 million entries. To support the levels of load, 10 partitions of the data are required instead of 6. To increase the number of partitions, the system is stopped. While the system is stopped, the data is partitioned into 10 partitions. After the 10 partitions are created, the system is restarted. While the system is stopped, however, access to the data is interrupted.

SUMMARY

Embodiments include a method that associates each of a plurality of replication queues with each of a first plurality of partitions for a data set. Each of these replication queues is configured to send data updates to a proxy for a second plurality of partitions. The data set is repartitioned from the first plurality of partitions to a second plurality of partitions while allowing access to the first plurality of partitions of the data set. The first plurality of partitions and the second plurality of partitions are of different numbers of partitions. Updates that target the data set during the repartitioning are queued in corresponding ones of the plurality of replication queues. The updates are dequeued after the repartitioning, when the proxy for the second plurality of partitions becomes active. The updates are applied to the second plurality of partitions of the data set in an order of the dequeuing through a proxy for the second plurality of partitions. Read and write access to the data set is maintained without interruption during this process.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to increasing the number partitions, embodiments can also be used when decreasing the number of partitions. In other instances, well-known instruction instances, protocols, structures and techniques have not been shown in detail in order not to obfuscate the description.

A data set typically does not stagnate and remain the same size over time. The capabilities of hardware (e.g., servers and storage devices) also do not stagnate and remain the same. A data set is often repartitioned to accommodate changes in size of the data set and/or changes in hardware capability. Hundreds or thousands of writes may be performed on the data set (e.g., database, directory, etc.) every second. So even a few seconds of downtime are unacceptable. Instead of taking the data set offline, the data set can be repartitioned while still allowing access to the data set ("repartitioning live data"). Live data can be repartitioned by establishing replication queues for the new partitions while servicing write requests and read requests with the old partitions. After the data has been migrated, the replication queues are drained to ensure data integrity, and to make the data set stored by the new partitions current with respect to all changes that have occurred to the old partitions during the partitioning process.

Figure 1:
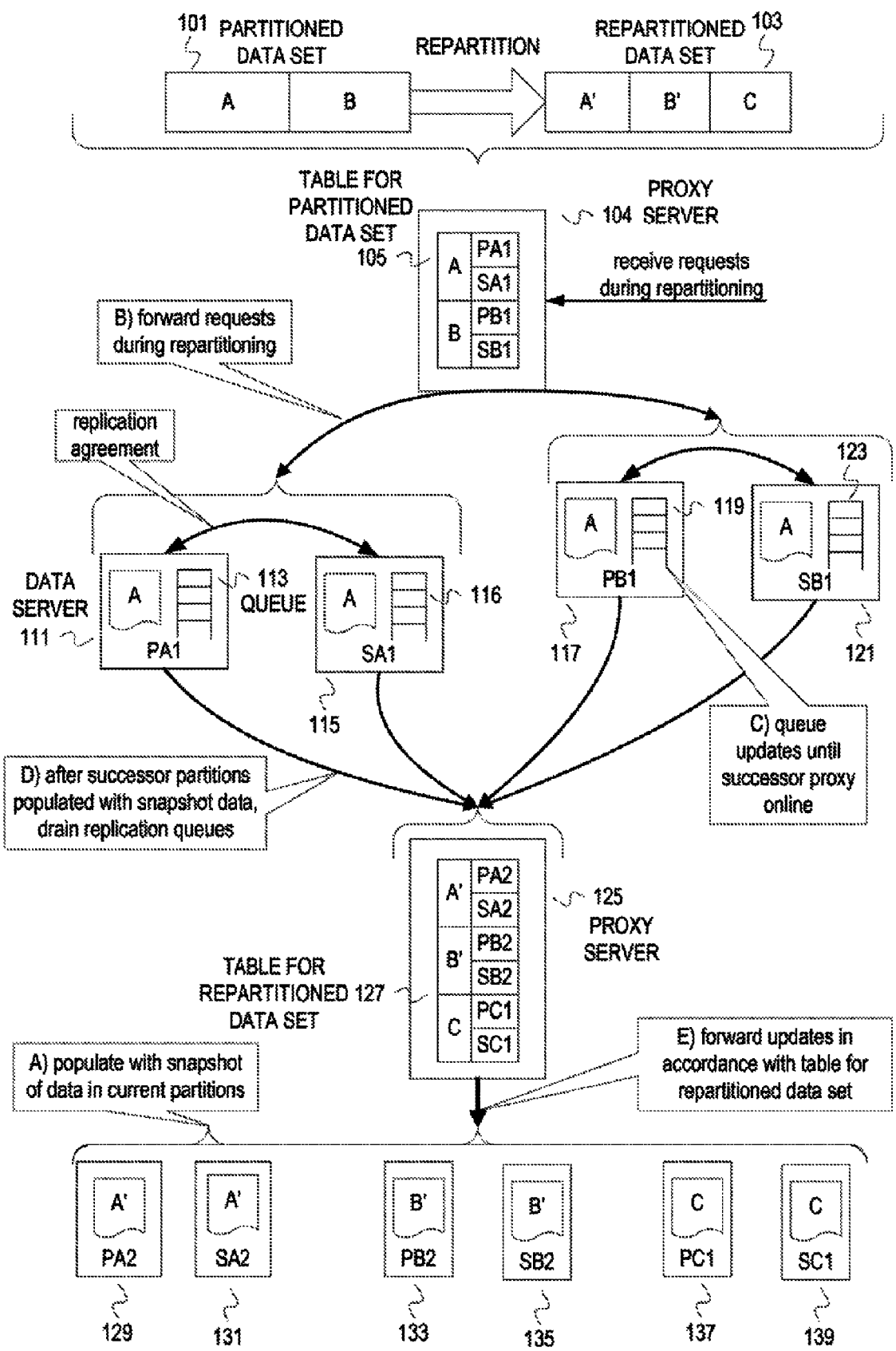
FIG. 1 depicts a conceptual diagram of an example repartitioning of live data.

FIG. 1 depicts a conceptual diagram of an example of live repartitioning of a data set. In FIG. 1, a partitioned data set 101 is being repartitioned into a repartitioned data set 103. The data set is being repartitioned from two partitions (A and B) to three partitions (A', B', and C). Data servers PA1 111 and SA1 115 host the data subset in partition A, and data servers PB1 117 and SB1 121 host the data subset in partition B. A variety of configurations can be implemented for load balancing, management, etc. In this example, PA1 111 has a replication agreement with the data server SA 1 115 to maintain synchronization between the two data servers 111 and 115. The data servers 117 and 121 also have a replication agreement in place between them.

A proxy server 104 fronts the data servers 111, 115, 117, and 121. The proxy server 104 forwards requests to the data servers 111, 115, 117, and 121 in accordance with a table 105 for the partitioned data set. The table 105 indicates that requests targeting data in partition A are to be forwarded to one of the data servers 111 and 115. The table 105 further indicates that requests targeting data in the partition B are to be forwarded to one of the servers 117 and 121.

Data servers PA2 129 and SA2 131, PB2 133 and SB2 135, and PC1 137 and SC1 139 will host the successor partitions A', B' and C, respectively. A successor proxy server 125 fronts the data servers 129, 131, 133, 135, 137, and 139. The proxy server 125 hosts a table 127 for the repartitioned data, which indicates forwarding information for the successor partitions.

At a stage A, a snapshot of the data set in the current partitions A and B is taken. The data servers 129, 131, 133, 135, 137, and 139 are populated with the snapshot data in accordance with the successor partitions. For example, a managing server sends commands to implement the snapshot.

After the snapshot is taken and while the successor partitions are being populated with the snapshot data, the proxy server 104 continues to receive requests, including write requests, and forwards the requests according to the table 105, at a stage B. So, requests are still being serviced during the repartitioning.

At an earlier point in time replication agreements are established between the proxy server 125 and the data servers 111, 115, 117, and 121. The proxy server 125 is not yet active, so the data servers do not forward the write requests to satisfy the replication agreements. The data servers 111, 115, 117, and 121 queue the write requests in replication queues 113, 116, 119, and 123, respectively, at a stage C. The snapshot is typically taken immediately after the replication agreements are established between the proxy server 125 and the data servers 111, 115, 117, and 121, so that all data updates occurring on these machines after the snapshot is taken are added to the replication queues associated with these replication agreements.

After population of the successor partitions is complete, the proxy server 125 is activated (e.g., turned on, connections allowed, ports opened, etc.). At a stage D, the data servers 111, 115, 117, and 121 drain their replication queues 113, 116, 119, and 123 after the successor partitions have been populated with the snapshot data. The proxy server 125 receives the write request drained from the replication queues, and begins to forward the write requests in accordance with the table 127, at a stage E.

The use of stages to identify order of activities in FIG. 1 is meant to aid in understanding embodiments and should not be used to limit embodiments. The activities may occur at discrete points in time, the activities may overlap, etc.

It should be understood that FIG. 1 depicted a less complex scenario than may be encountered. Embodiments are not limited to a partition being hosted on two data servers. Live data repartitioning may be performed on a database or directory with several data servers for each partition, non-uniform numbers of data servers for different partitions, etc. In addition, the proxies depicted in FIG. 1 may be implemented on a single device (e.g., proxy applications or processes on a single network machine). Furthermore, a request may target multiple partitions with a response that requires aggregation of data across the multiple partitions.

Figure 2:
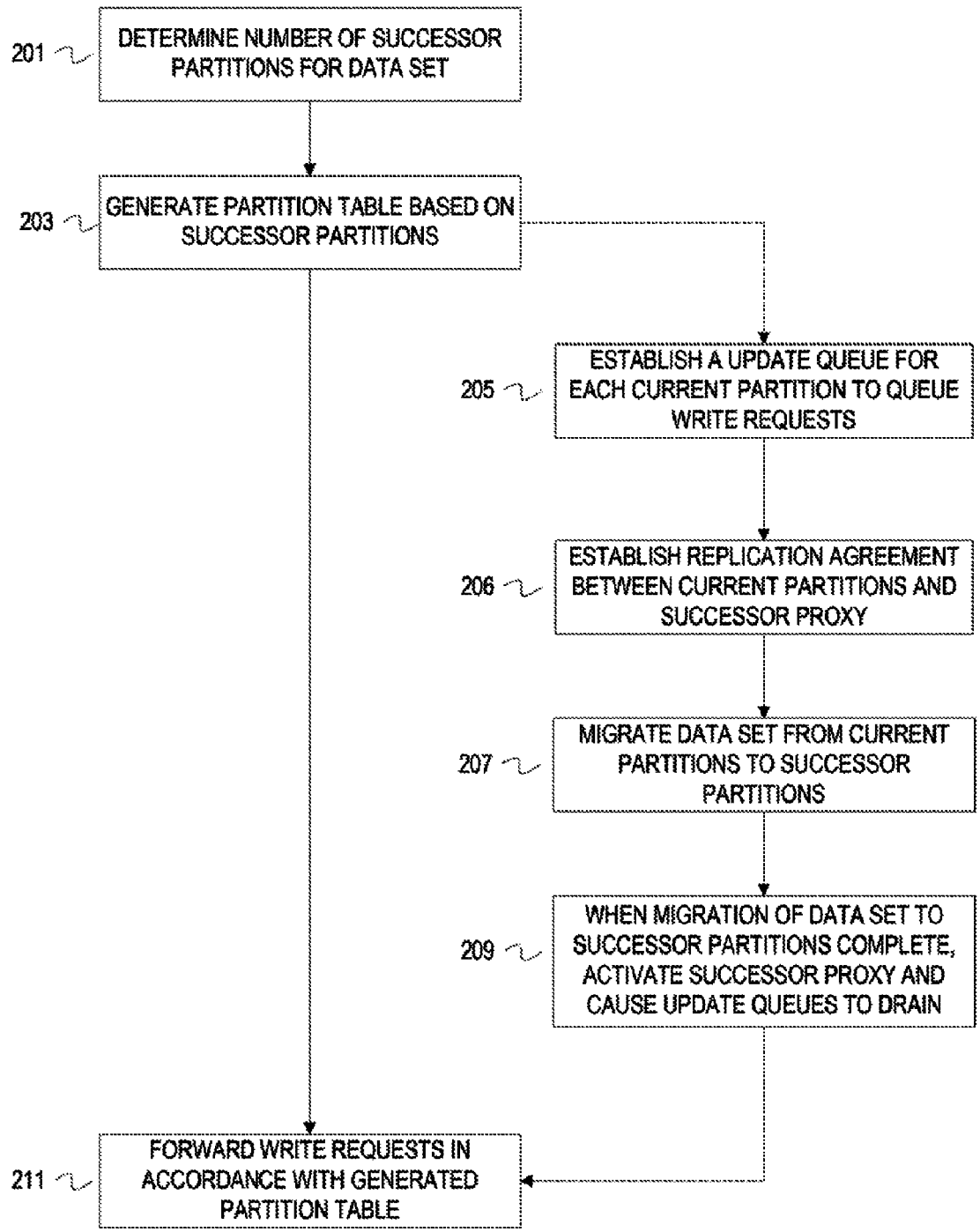
FIG. 2 depicts a flowchart of example operations for repartitioning live data.

FIG. 2 depicts a flowchart of example operations for repartitioning live data. At block 201, a number of successor partitions is determined. For example, a managing server informs a proxy server of the number. In another example, a user configures the proxy server with the number or a file is read to determine the number. At block 203, a partition table is generated based on the number of successor partitions. For example, a proxy generates the table. In another example, the table is transmitted to the proxy from a managing server.

A dashed line from block 203 to block 205 represents a flow of control, possibly between different devices. At block 205, a replication queue is established for each current partition to queue write requests. Referring back to FIG. 1, each of the partitions A and B would have a queue established at the corresponding data server(s) for write requests. At block 206, a replication agreement(s) is established between the current partitions and the successor proxy. At block 207, the data set is migrated from the current partitions to the successor partitions. In one embodiment, a snapshot of the data set is taken and used to populate the successor partitions. In another embodiment, a snapshot is not taken and replication is carried out between the current partitions and the successor proxy.

At block 209, the successor proxy is activated and the replication queues are caused to be drained, after migration of the data set is complete.

A dashed line from block 209 to block 211 represents possible control flow between devices. At block 211, the write requests drained from the replication queues are forwarded in accordance with the generated partition table.

Figure 3:
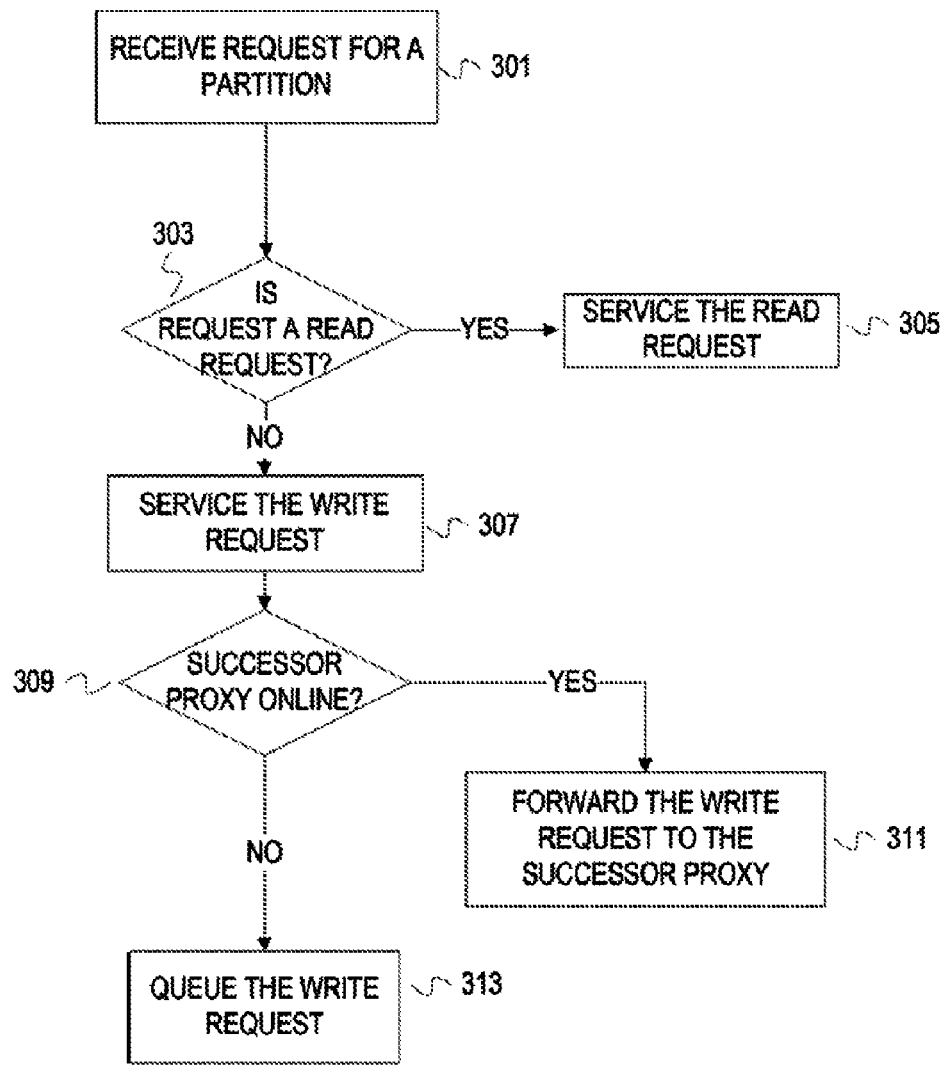
FIG. 3 depicts a flowchart of example operations for handling requests during live data repartitioning.

FIG. 3 depicts a flowchart of example operations for handling requests during live data repartitioning. At block 301, a request is received for a partition. For example, a data server receives a request from a proxy. At block 303, it is determined if the request is a read request. If the request is a read request, then control flows to block 305. If the request is a write request, then control flows to block 307.

At block 305, the read request is serviced.

At block 307, the write request is serviced. At block 309, it is determined if the successor proxy is online. If the successor proxy is online, then control flows to block 311. If the successor proxy is not online, then control flows to block 313.

At block 311, the write request is forwarded to the successor proxy.

At block 313, the write request is placed in a replication queue.

It should be understood that the example operations of the depicted flowchart are examples meant to aid in understanding embodiments, and should not be used to limit embodiments. Embodiments may perform additional operations, fewer operations, operations in a different order, and operations in parallel. For instance, a write request may target multiple partitions of a partitioned data set. Operations would be performed to determine the additional partitions and handle forwarding of the write request to multiple servers and queuing copies of the write request in multiple ones of the replication queues. Referring to FIG. 3, the individual write requests may not be processed. In an embodiment, the deltas are captured periodically and transmitted to the successor proxy. Block 309 may not be explicitly performed in some embodiments because if the forward fails, then the request is queued, for instance. Referring to FIG. 2 as an example, block 203 may be performed by a different process, thread, or even device than the process, thread or device that that handles repartitioning.

In another embodiment, no snapshot is taken. Instead, replication agreements are established between the proxy server 125, and the data servers 111, 115, 117, and 121. The new proxy and the new partitions are made active, without data present. Then the data is replicated from the old partitions on 111, 115, 117, and 121 to the proxy 125, and each data write is routed by the proxy 125 to the new partitions on data servers 129, 131, 133, 135, 137, and 139. Data access to the old partitions continues without interruption during this process, including updates to the old partitions. During this replication process, updates to the data on the old partitions may occur, and these updates are queued in the replication queues to be sent when replication of the previously existing data has completed.

The described embodiments may be provided as a computer program product, or software, that may include a machine-readable medium having stored thereon instructions, which may be used to program a computer system (or other electronic device(s) to perform a process according to embodiments of the invention(s), whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); hash memory; or other types of medium suitable for storing electronic instructions.

Figure 4:
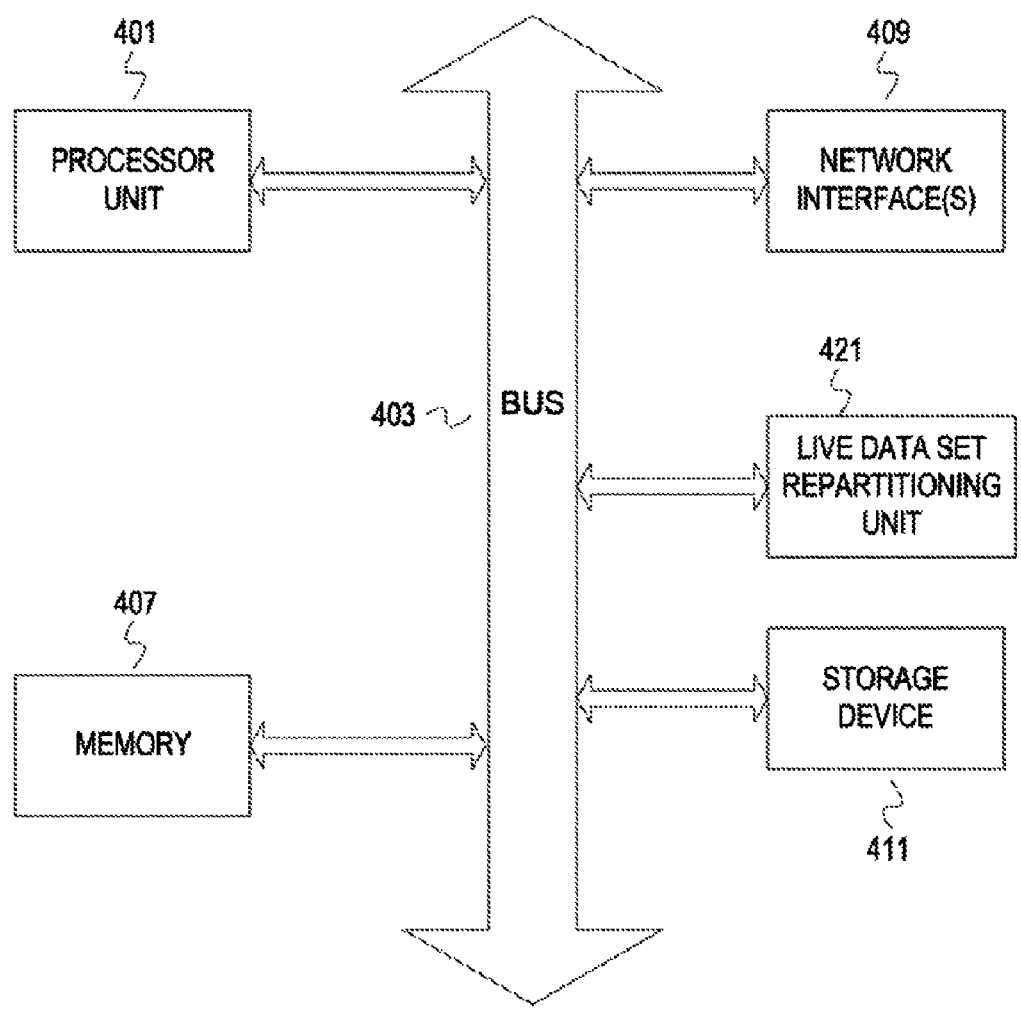
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONGS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet Interface, a Frame Relay interface, SONET interface, wireless interlace, etc.), and a storage device(s) 409 (e.g., optical storage, magnetic storage, etc.). The computer system also includes a live data set repartitioning unit 421, implemented functionality in accordance with embodiments described above. The system memory 407 may embody one or more functionalities that facilitate repartitioning of live data instead or in addition to the live data set repartitioning unit 421. Any one of these functionalities may be partially (or entirely) implemented in hardware and/or on the processing unit 401 instead of or in addition to the live data set repartitioning unit 421. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, the live data set repartitioning unit 421, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the invention(s) is not limited to them. In general, techniques for repartitioning live data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
    associating each of a plurality of replication queues with each of a first plurality of partitions for a data set;
    repartitioning the data set from the first plurality of partitions to a second plurality of partitions while allowing access to the first plurality of partitions of the data set via a first proxy that forwards requests targeting the first plurality of partitions in accordance with a first mapping that maps the first plurality of partitions to first hardware hosting the first plurality of partitions, the first plurality of partitions and the second plurality of partitions being different numbers of partitions;
    queuing updates that target the data set during the repartitioning in corresponding ones of the plurality of replication queues;
    after the repartitioning, dequeueing the updates to a second proxy for the second plurality of partitions; and
    the second proxy applying the updates to the second plurality of partitions of the data set in an order of the dequeuing and in accordance with a second mapping that maps the second plurality of partitions to second hardware hosting the second plurality of partitions.

2. The method of claim 1, wherein the repartitioning comprises:
    taking a snapshot of the data set in the first plurality of partitions;
    populating the second plurality of partitions with the snapshot.

3. The method of claim 2, wherein said applying the updates occurs after said populating completes.

4. The method of claim 1, wherein said repartitioning comprises replicating data from the first plurality of partitions to the second plurality of partitions via the second proxy.

5. The method of claim 1 further comprising establishing replication agreements between each of the partitions of the first plurality of partitions and the second proxy for the second plurality of partitions.

6. The method of claim 1, wherein the updates comprise one of write requests and replication operations.

7. The method of claim 1, wherein the first plurality of partitions comprises one of a database and a directory.

8. A method comprising:
    associating each of a plurality of update queues with respective ones of a first plurality of partitions for a data set hosted across a plurality of servers;
    while allowing access to the first plurality of partitions, migrating the data set from the first plurality of partitions to a second plurality of partitions to accommodate an increase in size of the data set;
    during the migrating,
        a first proxy forwarding read requests that target the data set to appropriate ones of the first plurality of partitions in accordance with a first mapping that maps the first plurality of partitions to corresponding ones of the plurality of servers,
        the first proxy forwarding write requests that target the data set to appropriate ones of the first plurality of partitions in accordance with the first mapping, and queuing updates that target the data set in the plurality of update queues; and after the migrating, draining the plurality of update queues to a second proxy for the second plurality of partitions that processes the drained updates in order of said queuing and in accordance with a second mapping that maps the second plurality of partitions to a second plurality of servers.

9. The method of claim 8, wherein the first plurality of partitions comprises one of a database and a directory.

10. The method of claim 8, wherein said migrating comprises one of replicating from the first plurality of partitions to the second plurality of partitions via the second proxy, and populating the second plurality of partitions with a snapshot of data in the first plurality of partitions.

11. The method of claim 8 further comprising establishing replication agreements between the first plurality of partitions and the second proxy.

12. One or more machine-readable media having stored therein a program product, which when executed a set of one or more processor units causes the set of one or more processor units to perform operations that comprise:

associating each of a plurality of replication queues with each of a first plurality of partitions for a data set;

repartitioning the data set from the first plurality of partitions to a second plurality of partitions while allowing access to the first plurality of partitions of the data set via a first proxy that forwards requests targeting the first plurality of partitions in accordance with a first mapping that maps the first plurality of partitions to first hardware hosting the first plurality of partitions, the first plurality of partitions and the second plurality of partitions being different numbers of partitions;

queuing updates that target the data set during the repartitioning in corresponding ones of the plurality of replication queues;

after the repartitioning, dequeueing the updates to a second proxy for the second plurality of partitions; and the second proxy applying the updates to the second plurality of partitions of the data set in an order of the dequeuing and in accordance with a second mapping that maps the second plurality of partitions to second hardware hosting the second plurality of partitions.

13. The machine-readable media of claim 12, wherein the repartitioning operation comprises:

taking a snapshot of the data set in the first plurality of partitions;

populating the second plurality of partitions with the snapshot.

14. The machine-readable media of claim 13, wherein said applying the updates occurs after said populating completes.

15. The machine-readable media of claim 12 further comprising establishing replication agreements between each of the partitions of the first plurality of partitions and the second proxy for the second plurality of partitions.

16. The machine-readable media of claim 12, wherein the first plurality of partitions comprises one of a database and a directory.

17. An apparatus comprising:

a set of one or more processor units;

a network interface coupled with the set of one or more processor units; and a live data set repartitioning unit operable to, associate each of a plurality of replication queues with each of a first plurality of partitions for a data set;

repartition the data set from the first plurality of partitions to a second plurality of partitions while allowing access to the first plurality of partitions of the data set via a first proxy that forwards requests targeting the first plurality of partitions in accordance with a first mapping that maps the first plurality of partitions to first hardware hosting the first plurality of partitions, the first plurality of partitions and the second plurality of partitions being different numbers of partitions;

queue updates that target the data set during the repartitioning in corresponding ones of the plurality of replication queues;

after the repartitioning, dequeue the updates to a second proxy for the second plurality of partitions; and apply the updates to the second plurality of partitions of the data set in an order of the dequeuing and in accordance with a second mapping that maps the second plurality of partitions to second hardware hosting the second plurality of partitions.

18. The apparatus of claim 17, wherein the updates comprise one of replication operations to be performed after one or more snapshots of the first plurality of partitions is taken, and write requests that occur after replication of one or more of the first plurality of partitions to one or more of the second plurality of partitions.

19. The apparatus of claim 17, wherein the live data set repartitioning unit is further operable to establish a replication agreement with the second proxy.

20. The apparatus of claim 17, wherein the live data set repartitioning unit is further operable to detect when the second proxy is available to begin draining the plurality of replication queues.

* * * * *